(12) United States Patent
Van Dyke

(10) Patent No.: US 10,663,178 B2
(45) Date of Patent: May 26, 2020

(54) THERMAL INSULATING APPARATUS AND USES THEREOF

(71) Applicant: Innovative North, Iron Bridge (CA)

(72) Inventor: Wally Van Dyke, Iron Bridge (CA)

(73) Assignee: Innovative North, Iron Bridge (CA)

(*) Notice: Subject to any disclaimer, the term of this patent is extended or adjusted under 35 U.S.C. 154(b) by 776 days.

(21) Appl. No.: 15/062,340

(22) Filed: Mar. 7, 2016

(65) Prior Publication Data

US 2016/0273783 A1 Sep. 22, 2016

(30) Foreign Application Priority Data

Mar. 6, 2015 (CA) ...................................... 2884117

(51) Int. Cl.
*F24D 5/00* (2006.01)
*F24S 20/63* (2018.01)
(Continued)

(52) U.S. Cl.
CPC .............. *F24D 5/005* (2013.01); *E04C 2/525* (2013.01); *E06B 7/08* (2013.01); *E06B 9/0638* (2013.01);
(Continued)

(58) Field of Classification Search
CPC .............. E04C 2/525; E05Y 2400/628; E05Y 2900/146; E06B 7/08; F24D 5/005;
(Continued)

(56) References Cited

U.S. PATENT DOCUMENTS 4,237,956 A * 12/1980 Sivin ......................... E06B 9/40
160/120
4,312,328 A * 1/1982 Leyman, III ............ F24S 30/20
126/627
(Continued)

FOREIGN PATENT DOCUMENTS

CA 2393273 A1 1/2004
CA 2647187 A1 * 6/2010 ......... F24D 17/0021
(Continued)

OTHER PUBLICATIONS

InSite Energy. Retrieved from the Internet on Mar. 22, 2016: <<http://insitenrg.com/products/>>.
(Continued)

*Primary Examiner* — Jorge A Pereiro
*Assistant Examiner* — Logan P Jones
(74) *Attorney, Agent, or Firm* — Marshall, Gerstein & Borun LLP

(57) ABSTRACT

A thermal insulating apparatus for insulating a building envelope is provided. The thermal insulating apparatus may comprise at least one panel comprising one or more layers of insulating material, and at least one attachment site for joining the thermal insulating apparatus to at least one position of said building envelope. The thermal insulating apparatus may be operable between an open position allowing access to a wall opening, and a closed position in which at least one panel of the thermal insulating apparatus substantially covers and thermally insulates said wall opening. The thermal insulating apparatus may further comprise at least one solar thermal energy collector unit for collecting heat from solar thermal energy from sunlight, and the collected heat may be used for heating a structure such as a home or garage.

7 Claims, 8 Drawing Sheets

(51) Int. Cl.
*F24S 80/30* (2018.01)
*F24S 80/60* (2018.01)
*E06B 7/08* (2006.01)
*E06B 9/06* (2006.01)
*E04C 2/52* (2006.01)
*F24S 20/66* (2018.01)

(52) U.S. Cl.
CPC .............. *F24S 20/63* (2018.05); *F24S 80/30* (2018.05); *F24S 80/60* (2018.05); *E05Y 2400/628* (2013.01); *E05Y 2900/146* (2013.01); *F24S 20/66* (2018.05); *Y02B 10/20* (2013.01); *Y02E 10/44* (2013.01)

(58) Field of Classification Search
CPC ........ F24J 2/0433; F24J 2/0444; F24J 2/4647; F24J 2/51; Y02B 10/20; Y02E 10/44
USPC .......................................................... 126/632
See application file for complete search history.

(56) References Cited

U.S. PATENT DOCUMENTS

| | | | | |
|---|---|---|---|---|
| 4,436,084 A | * | 3/1984 | Carlston | F24S 20/63 126/628 |
| 5,435,108 A | * | 7/1995 | Overholt | E04C 2/292 160/236 |
| 8,757,143 B2 | | 6/2014 | Edens et al. | |
| 2014/0290157 A1 | * | 10/2014 | Wilson | E06B 9/04 52/173.3 |

FOREIGN PATENT DOCUMENTS

| | | | | | |
|---|---|---|---|---|---|
| DE | 2603811 A1 | * | 7/1977 | ............. | F24S 10/00 |
| EP | 0002700 A1 | * | 7/1979 | ............. | E06B 7/08 |
| FR | 2353811 A1 | * | 12/1977 | ............. | E06B 9/04 |
| FR | 2487485 A1 | * | 1/1982 | ............. | F24S 20/63 |
| FR | 2497563 A1 | * | 7/1982 | ............. | F24S 20/63 |
| FR | 2501839 A1 | * | 9/1982 | ............. | F24S 20/63 |
| WO | WO-9857101 A1 | | 12/1998 | | |

OTHER PUBLICATIONS

Social Thermal Training. Retrieved from the Internet on Mar. 22, 2016: <<http://www.solarthermaltraining.org/sunmaxx-m2-solar-flat-plate-collectors <https://protect-us.mimecast.com/s/oX6NBGubE6ud>>.

* cited by examiner a)

b)

a)

b)

a)

b)

THERMAL INSULATING APPARATUS AND USES THEREOF

CROSS-REFERENCE TO RELATED APPLICATION

The present application claims priority to Canadian Patent Application No. 2,884,117, filed Mach 6, 2015, which is hereby incorporated herein by reference.

FIELD OF INVENTION

The present invention relates generally to heat generating and/or insulating structures for a building envelope, including wall sections and/or wall openings. More specifically, the present invention relates to panels having insulating and/or solar thermal energy collecting/heat generating properties.

BACKGROUND

Exterior wall openings are often poorly insulated, and represent major sites of potential heat loss from homes, garages, and other structures, especially during cold winter months. Heat loss from exterior wall openings results in increased annual heating costs for home owners and increased household energy consumption.

Insulating properties of a material are often measured in terms of thermal resistance. R-value is a commonly used measure of thermal resistance. A typical exterior wall may have an R-value of around R-20. Wall openings such as windows or doors, on the other hand, are typically less than R-7. Thus, exterior wall openings represent an important source of heat loss from homes, apartments, offices, garages, and other structures.

Exterior wall openings are often glazed or unglazed panels that can allow air and/or light into a room, and/or provide access to and from the room. Building code standards accept reduced insulation standards for wall openings because typical windows and doors have an insulative capacity which does not extend much beyond ~R-7 value (windows) or ~R-11 or 14 value (doors).

Exterior wall openings typically offer surfaces which are exposed to sunlight for at least part of the day. In some cases, window and door design and placement can allow sunlight to enter homes during the day, serving as a minor source of heat. Sunlight is also sometimes harnessed for heat using solar thermal panels or collectors such as those described in Canadian Patent Application No. 2,393,273 and/or PCT Publication No. WO 98/57101.

Solar-Thermal panels are often placed on a wall or roof exposed to winter sunshine to provide heat. However, the available solar thermal panels do not provide insulation to exterior wall openings such as doors and windows, for example.

Wall sections of a building envelope also lose heat, and often feature large surface areas which are typically covered with siding, brick, or other building materials which do not provide much benefit in terms of energy capture from sunlight. Wall sections of a building envelope may thus be modified with solar energy collectors such as, for example, a solar powered furnace as described in U.S. Pat. No. 8,757,143.

An alternative, additional, and/or improved insulating and/or heat generating structure is desirable.

SUMMARY OF INVENTION

In an embodiment, the present invention provides a thermal insulating apparatus for insulating a wall opening, said thermal insulating apparatus comprising:
- at least one panel comprising one or more layers of insulating material, and
- at least one attachment site for joining the thermal insulating apparatus to at least one position at said wall opening;
- the thermal insulating apparatus being operable between an open position allowing access to said wall opening and a closed position in which the least one panel of the thermal insulating apparatus substantially covers and thermally insulates said wall opening.

In another embodiment of a thermal insulating apparatus described herein, the thermal insulating apparatus may further comprise at least one solar thermal energy collector unit for collecting heat from solar thermal energy from sunlight.

In yet another embodiment of a thermal insulating apparatus described herein, the solar thermal energy collector unit may be integrated in the panel opposite the one or more layers of insulating material.

In still another embodiment of a thermal insulating apparatus described herein, the solar thermal energy collector unit may be connected, or connectable, to ductwork for distributing collected heat to an interior space of a structure comprising the wall opening.

In a further embodiment of a thermal insulating apparatus described herein, collected solar thermal energy may distributed to the interior space by circulation of air or fluid heated by the solar thermal energy collector unit so as to allow heat exchange between the heated air or fluid and the interior space.

In yet another embodiment of a thermal insulating apparatus described herein, the wall opening may be a window or swinging or sliding door.

In another embodiment of a thermal insulating apparatus described herein, the wall opening may be an overhead door.

In still a further embodiment of a thermal insulating apparatus described herein, the solar thermal energy collector unit may collect heat from solar thermal energy while in the open position.

In another embodiment of a thermal insulating apparatus described herein, the solar thermal energy collector unit may collect heat from solar thermal energy while in the closed position.

In yet another embodiment of a thermal insulating apparatus described herein, the thermal insulating apparatus may be integrated on the exterior-facing side of a door or window.

In another embodiment of a thermal insulating apparatus described herein, the solar thermal energy collector unit may be, for example, a screen collector-type solar thermal energy collector unit.

In still another embodiment, there is provided herein a thermal insulating apparatus for insulating a wall section of a building envelope, said thermal insulating apparatus comprising:
- at least one panel comprising one or more layers of insulating material for insulating the wall section;
- at least one solar thermal energy collector unit for collecting heat from solar thermal energy from sunlight, the solar thermal energy collector unit being integrated in the panel opposite the one or more layers of insulating material and being connectable to ductwork for distributing collected heat to an interior space of a structure comprising wall section; and at least one attachment site for joining the thermal insulating apparatus to at least one position at said wall section.

BRIEF DESCRIPTION OF DRAWINGS

These and other features, aspects and advantages of the present invention will become better understood with regard to the following description and accompanying drawings, wherein.

DETAILED DESCRIPTION

Figure 1:
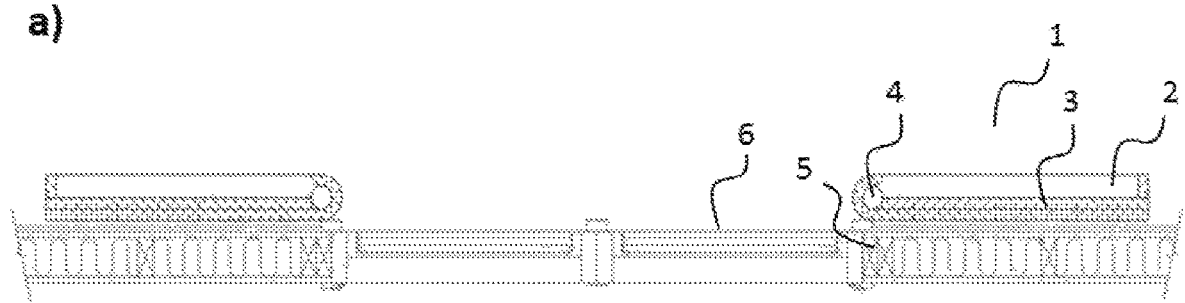
FIG. 1 shows a cross-sectional top view of one embodiment of a thermal insulating apparatus having insulation and heat generation features, installed at an exterior window opening. In a) the thermal insulating apparatus is in an open position, exposing solar thermal collector surfaces to sunlight, thus generating heat. b) shows that the thermal insulating apparatus is operable between an open position and a closed position. In c) the thermal insulating apparatus is in a closed position, increasing the insulation of the exterior wall opening.
Figure 1:
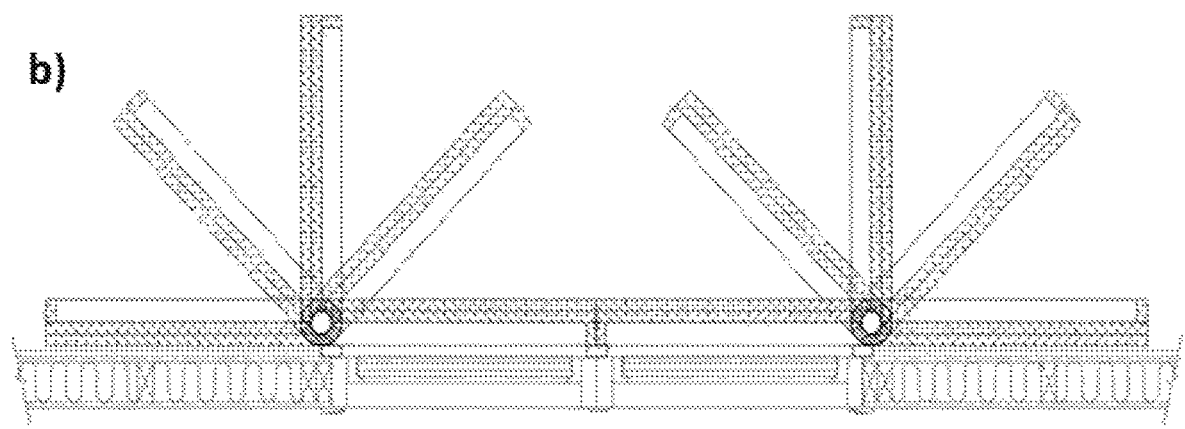
Figure 1:

Described herein are thermal insulating apparatus for insulating exterior wall openings and/or heating an interior space using heat collected from sunlight. It will be appreciated that embodiments and examples are provided for illustrative purposes intended for those skilled in the art, and are not meant to be limiting in any way.

It will be understood that wall openings may include any opening in a wall of a home, office, industrial building, or other structure, such as a window (for example, a fixed or opening window), swinging door (for example, a front or back door, French doors), sliding door (for example, a patio door), overhead door (for example, a garage door), access panel or hatch, skylight, or other opening or section having reduced insulation properties.

Embodiments of thermal insulating apparatus provided herein may comprise one or more than one panel(s). For example, a thermal insulating apparatus installed at a window opening may include two separate panels, each covering separate portions of a window while both panels are in a closed position. Each panel may be independently operable between open and closed positions. By way of example, a shutter-type arrangement may be used. In other embodiments, a thermal insulating apparatus installed at a window may comprise a single panel, or more than one panel joined together such that the panels operate as a single unit. In an embodiment, a thermal insulating apparatus installed at an overhead garage door may comprise two or more panels which are linked in series by hinges, joints, or other folding/bending attachment means, to allow the thermal insulating apparatus to operate between closed (i.e. extended) and open (i.e. folded/contracted) states.

Panels may be insulating (i.e., is some embodiments, have an R-value of about R13 to about R28), and/or may have solar thermal collection and heat generation properties. In some embodiments, up to R-14 may be added to a wall opening, or up to R-28 may be added to a wall opening by the thermal insulating apparatus panel(s). In thermal insulating apparatus having more than one panel, each panel may independently be insulating, heat-generating, or both. If the thermal insulating apparatus has more than one heat generating panel, two or more of the thermal insulating panels may optionally be connected while in a heat-generating position, allowing the same heat exchange air or fluid to circulate through and be heated by two or more of the panels. Heat-generating panels may also heat and circulate heat exchange air or fluid independently of other panels in the thermal insulating apparatus.

In an embodiment, each panel of a thermal insulating apparatus may comprise one or more sections, layers, or portions having insulating and/or heat generating properties. In some embodiments, panels may comprise one or more layers of insulating material, for insulating wall openings. In other embodiments, panels may comprise one or more solar thermal collector/heat generating portions, for collecting heat from sunlight. In further embodiments, panels may comprise one or more layers of insulating material, and one or more solar thermal collector/heat generating portions. In embodiments having both insulating and heat generating features, one side of the panel may be an insulating side comprising one or more insulating layers, while the other side may be a heat generating side comprising a solar thermal collecting/heat generating section. Sandwiching of layers may also be used, for example a panel having an insulating portion sandwiched between two solar thermal collecting portions on either side may be used. In this case, the panel may be capable of generating heat from sunlight regardless of whether the thermal insulating apparatus is in an open or a closed position.

In some examples, panels having a solar thermal collecting feature (and, optionally, an insulating feature) may be used on wall openings positioned to receive sunlight, while panels having an insulating feature may be used on wall openings which are substantially shaded throughout the day. It is also possible that such panels may be similarly used on a wall section of a building envelope.

Insulating layers/portions may comprise any suitable insulating material known to the person of skill in the art. Examples of suitable insulting material may include, but are not limited to, fibreglass, polyurethane, polyisocyanurate, Styrofoam, urethane or polystyrene foam insulation, or any other suitable insulating material, or a combination thereof. Insulating sections or sides of panels may optionally comprise more than one layer of the same or different insulating materials. Thermal insulating apparatus may insulate a wall opening to help keep heat from escaping through said wall opening, or may be used to prevent heat from the outside from entering through said wall opening, or both depending of the season or outside temperature, thus reducing heating and/or cooling costs. Insulating materials may additionally have soundproofing and/or fire-resistance and/or UV protection features.

Solar thermal collector portions/sides/layers may comprise any suitable solar thermal collector, solar thermal panel, flat plate solar collector, or other suitable collector which allows for the generation of heat via the capturing of energy from sunlight, as will be known to the person of skill in the art. Solar thermal collectors may be connectable to ductwork or piping, and may comprise a circulating fan or pump for circulating heat exchange air or fluid between the solar thermal collector and an interior space to be heated, such as a living space of a home or the interior of a garage or other structure to be heated. The circulating fan or pump may be part of the thermal insulating apparatus, may be part of the ductwork or piping to which the thermal insulating apparatus is connected, or may be an independent device. The heat exchange air or fluid may comprise air, water, or a water/solvent blend such as, but not limited to, a water/ethylene glycol or water/methanol mixture. The skilled person will be aware of several suitable heat exchange fluid options, which may in some embodiments be selected to avoid freezing under cold winter conditions.

In certain embodiments, solar thermal collectors may generate up to about 3800 BTUs of heat output per 1 $m^2$ of opening. On a typical residential home with a double garage (i.e., two doors of approximately 7' by 9'), it may be possible to produce up to around 44,000 BTUs per hour using solar thermal collectors units.

Thermal insulating apparatus as described herein may be mounted, fitted, joined, attached, placed, suspended, or coupled to, near, at, on, or adjacent a wall opening. For example, thermal insulating apparatus for installation at a window may be fitted to the window in hinged manner similar to that used for window shutters, or may be attached through a rail or track to allow sliding movement of the thermal insulating apparatus between open and closed positions. Thermal insulating apparatus for installation at a swinging door may be installed in a manner similar to that of the swinging door itself (i.e. with a hinged attachment), or may be attached through a rail or track to allow sliding movement of the thermal insulating apparatus between open and closed positions. Thermal insulating apparatus for installation at an overhead door may be installed having a pivot section at the top, and a lower lift bar section at the bottom, such that opening of the overhead door may also result in operation of the thermal insulating apparatus into an open position. Alternatively, thermal insulating apparatus for installation at an overhead door may be installed through hinged attachment, or may be attached through a rail or track to allow sliding movement of the thermal insulating apparatus between open and closed positions. In some embodiments, thermal insulating apparatus for installation at an overhead door may be installed with an overhead lifting mechanism similar to, but independent from, that of the overhead door. By way of example, a cable lift-type mechanism may be used in certain embodiments.

It will be recognized that many options may be used for fitting thermal insulating apparatus as described herein to wall openings, and that the person of skill in art having regard to this disclosure will be able to identify suitable options, taking into account the type of wall opening (window, door, overhead door, etc. . . . ), the position and surroundings of the wall opening, the amount of sunlight the opening receives, and the type of thermal insulating apparatus being used (single or multi-panel, insulating or heat generating or both, etc. . . . ).

Optionally, thermal insulating panels may be used to additionally provide added security to a home or structure by preventing break-ins, and/or may protect wall openings such as windows from damage or from the elements while in a closed position.

Optionally, thermal insulating panels may be used to additionally provide sound insulation properties to a building.

Optionally, thermal insulating apparatus may be fitted with a skin or cover, such as a thin white-colored skin or cover, for summertime (hot weather) use. The skin may act as a reflective surface to prevent unwanted heating in hot weather, and/or increase lighting around a home or structure, or the skin or cover may comprise a photovoltaic surface for summertime electricity generation.

Examples and embodiments of thermal insulating panels as provided herein will now be described in further detail, with reference to FIGS. 1-7. It will be understood that these examples and embodiments are for illustrative purposes and are not intending to be limiting in any way.

FIG. 1 shows a cross-sectional top view of one embodiment of a thermal insulating apparatus (1) having insulation and heat generation features, installed at an exterior window opening (6). In a) the thermal insulating apparatus is in an open position, exposing solar thermal collector surfaces to sunlight, thus generating heat from solar energy. The illustrated thermal insulating apparatus (1) comprises two separate panels, each attached to exterior wall (5) near the window wall opening (6) via a hinged attachment (4). Each panel comprises a solar thermal collecting portion (2) on one side, and an insulating portion (3) comprising insulating material on the other side. The illustrated thermal insulating apparatus (1) is operable between an open position (see FIG. 1 *a*)), and a closed position (see FIG. 1 *c*)) via rotation at the hinge attachment (4) (see FIG. 1 *b*)). In the open position of a), the solar thermal collector portion (2) is exposed to sunlight, and the window is unobstructed. In the closed position of c), the window is covered by the thermal insulating apparatus (1), insulating the window to prevent heat loss, or to prevent heat entry. In cold weather, it may be useful to maintain the thermal insulating apparatus (1) in the open position to collect heat and provide it to the interior of the home during daylight sunshine hours, and in the closed position to insulate the window and prevent heat loss overnight. In hot weather, it may be useful to maintain the thermal insulating apparatus (1) in the closed position during the day to prevent heat and sunlight from entering the home, and in the open position during the night to allow for heat loss from the home overnight. As illustrated in FIG. 1(*b*), each panel of the thermal insulating apparatus (1) may be operated between open and closed positions independently in this embodiment.

Although the embodiment of a thermal insulating apparatus shown in FIG. 1 is illustrated as being installed at an exterior window opening, it will be understood that the thermal insulating apparatus shown in FIG. 1 may also be adapted to be installed at an exterior window, swing door opening, or another wall opening, and may be in the form of a single panel (shown on either side of FIG. 1 *a*)), or a dual or multi-panel configuration as shown.

Figure 2:
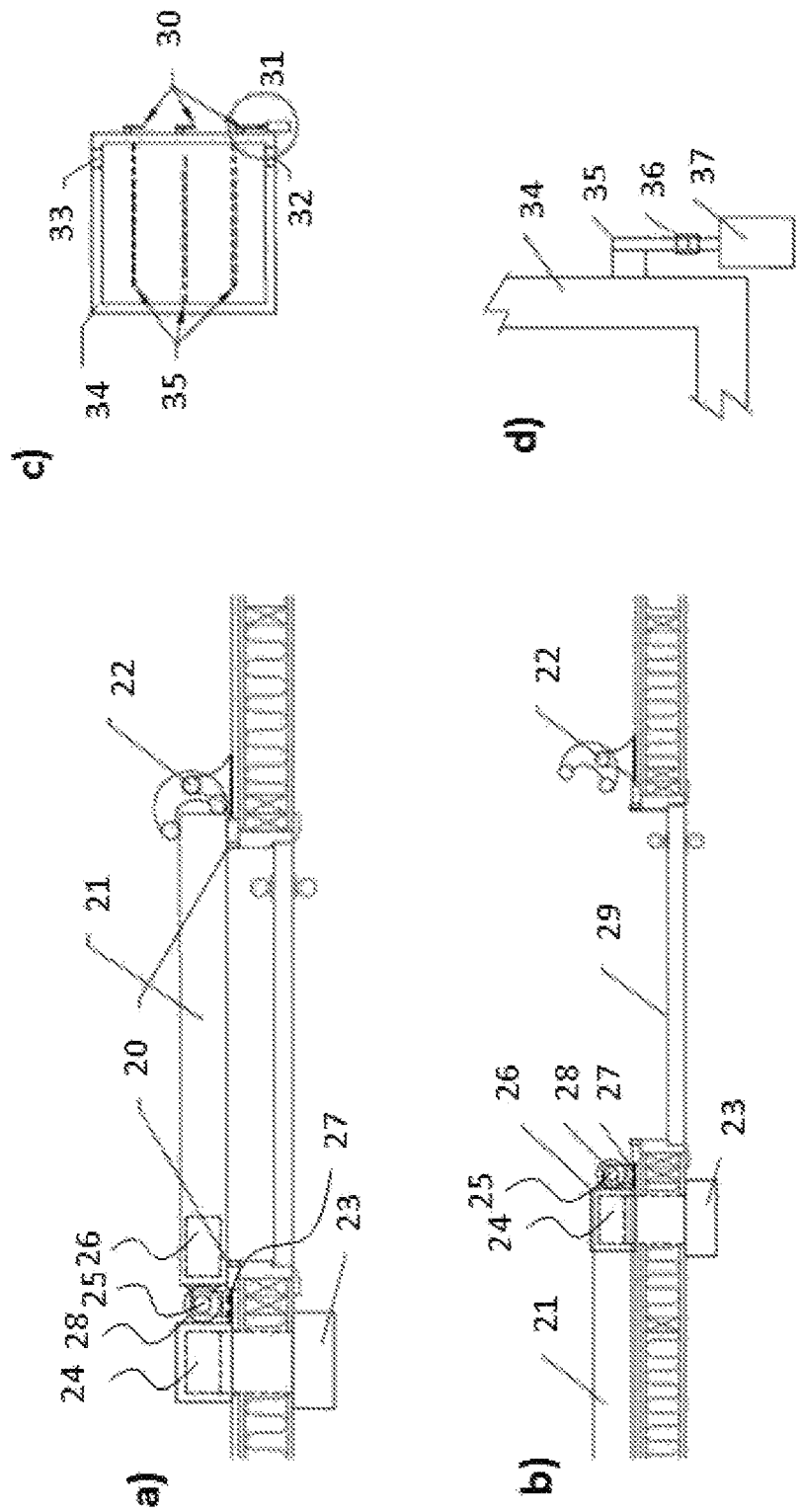
FIG. 2 shows another embodiment of a thermal insulating apparatus having insulation and heat generation features, installed at an exterior swing door opening. a) is a cross-sectional top view showing the thermal insulating apparatus in a closed position, providing insulation to the exterior wall opening. In b) the thermal insulating apparatus is shown in an open position in which solar thermal collector surfaces are exposed to sunlight, thus generating heat. c) is a cross-sectional side view of a thermal insulating apparatus panel, showing heat exchange air/fluid flow path through the panel. It will be understood that location and/or materials of the collector may be any suitable design as will be known to the person of skill in the art having regard to the teachings herein. For example, the location and/or design of a collector using a screen collector will be different from that shown in FIG. 2 c). In d), an optional automated motorized closing device is shown, which can operate the thermal insulating apparatus between open and closed positions.

FIG. 2 shows another embodiment of a thermal insulating apparatus having insulation and heat generation features, installed at an exterior opening. In FIG. 2 *a*), the thermal insulating apparatus, comprising a panel (21) having heat generation and insulation features, is in a closed position, providing insulation to the exterior wall opening (in this example, a swinging door). The thermal insulating apparatus is attached to the door frame via a hinged attachment (25) anchored by lag bolts (27) or other fasteners having suitable pullout strength. The panel (21) may be maintained in the closed position by latch (22), which may optionally be a spring loaded latch, to ensure that seals (20) (for example, polypropylene seals) are firmly sealed to the perimeter of the wall opening. In FIG. 2 *b*), the thermal insulating apparatus is in the open position, exposing the solar thermal collection portion to sunlight, generating heat. In the open position, panel opening (26) engages ductwork (24) which connects to the interior of the home, such that air heated in the solar thermal collector portion can provide heat to the interior of the home. Panel opening (26) may, in an embodiment, sealingly engage and align so as to be in communication with ductwork (24) while in the open position. Panel opening (26) and/or corresponding ductwork (24) opening may, in another embodiment, have a flap, such as a hinged or spring loaded flap, or other covering, which at least partially seals the openings while in the closed position. Such a flap may automatically, or manually, become unsealed when the thermal insulating apparatus is in the open position and the panel opening (26) and ductwork (24) are aligned, and may optionally be used to at least partially regulate the supply of heat to the home via opening and closing in response to temperature either manually or automatically. The ductwork (24) comprises a optional circulation fan (23) (such as, for example, a fan having about 100 CFM and about 6.0 Sones sound level, or less), for circulating the heat exchange air between the solar thermal collector portion of panel (21), and the interior of the home, via ductwork (24). Opening (26) of panel (21) may be engaged with ductwork (24) while the thermal insulating apparatus is in the open position, and one or both of (26) and (24) may be open or reversibly closed, blocked, or sealed while in the closed position. In the illustrated embodiment, a motor (28) is provided to operate the panel (21) between open and closed positions, optionally in an automated manner optionally based on time of day, amount of available sunlight, user input, and/or temperature indoors, in the ductwork, and/or outside, or any combination thereof. FIG. 2 *c*) shows an embodiment of a panel comprising a solar thermal collecting portion. The panel comprises a cold air inlet (32), allowing air into the solar thermal collecting portion, support sections (35) for bracing and supporting the panel and optionally for increasing the path of air moving between cold air inlet (32) and warm air outlet (33). It should be noted that the path of air as depicted in FIG. 2 *c*) represents an illustrative and non-limiting embodiment, at that other flow paths may be possible. For example, if a screen collector-type solar thermal energy collector were used, a different flow path may be used as will be recognized by the person of skill in the art having regard to the teachings herein.

The panel may comprise a frame (34), optionally an aluminum frame or another lightweight frame, and hinge pins (30) for attachment to or near a wall opening. In certain embodiments, a hand-operated swing mechanism may be provided. In alternative or additional embodiments, an optional swing motor section (31), which is further illustrated in FIG. 2 *d*), may be provided. Swing motor section (31) may comprise a swing motor (37), such as a 120 VAC reversible motor or DC motor for off-grid applications, which may be attached, via coupler (36), to a hinge pin (35) attached to frame (34). The swing mechanism may be used to operate the thermal insulating apparatus between open and closed positions based on user input, or in an automated manner wherein the swing motor and/or circulation fan are controlled by a programmable and/or automated electronic device optionally having light and/or temperature sensors to determine a suitable open/closed thermal insulation apparatus position and/or a suitable circulation fan speed based on the time of day, temperature of the home and/or the outside temperature, the amount of sunlight directed at the thermal insulating apparatus, or a combination thereof, among other possible factors. An example of such automation is provided in FIG. 4 below.

Figure 3:
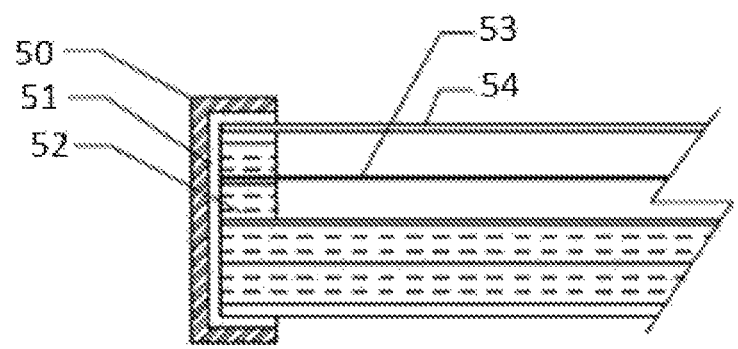
FIG. 3 shows a cross-sectional top view of embodiments of a thermal insulating apparatus panel. The panel in a) comprises solar thermal collector portion(s)/layer(s) on one side, and insulating portion(s)/layer(s) on the other side, and thus has both insulating and heat generating features. The panel in b) comprises insulating layer(s), thus having insulating features.
Figure 3:
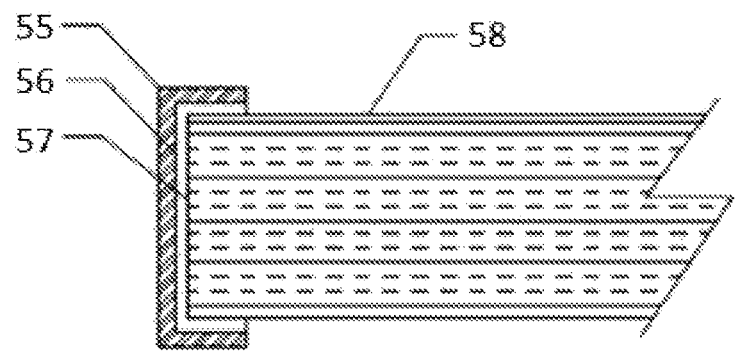

FIG. 3 shows a cross-sectional top view of embodiments of thermal insulating apparatus panels. The panel in a) comprises glazing material (54), solar collector (53), and insulating layers (52) around the perimeter and on the back side of solar thermal collector (53). The glazing material (54), solar thermal collector (53), and insulating layers (52) are held together and sealed by butyl tape (51) and aluminum channel (50) in this embodiment. The panel of a) is able to provide both insulation and heat generation. The panel in b) comprises cover material (58), insulation layers (57), butyl tape (56), and channel (55), and provides insulating features. It will be understood that the glazing may also extend outside the frame, and have an additional small angle bracket for attachment. It will also be understood that one insulation layer, or more than one insulation layer, may be used, depending on the insulating materials used and the environmental and operational requirements of the particular application.

In a non-limiting embodiment, the panel of FIG. 3 *a*) may comprise a glazing material (54) which is a polycarbonate sheet, IAW ANSI Z97.1 of about ³⁄₁₆", which a specific gravity of about 1.2, an ultimate tensile strength of about 9500 psi, a tensile modulus of about 340,000 psi, a flash ignition temperature of about 870 deg F., a flexural strength of about 5% strain, a flexural modulus of about 345,000 psi, a self ignition temperature of about 1075 deg F., and a substantially clear color. The solar collector (53) may comprise a perforated aluminum sheet, such as a kaycan 12" vented aluminum 3-panel soffit. Nominal thickness may be about 0.019", and it may be painted black on both sides. Wire mesh having similar available heat transfer area may also be substituted. Channel (50) may be an aluminum AISC structural shape C channel, with a size of about 4.00×1.72, with a web thickness of about 0.321 and a flange thickness of about 0.296", with a weight of about 2.500 LB/FT., and may be painted or powder coated black after fabrication of the frame. The butyl tape (51) may be Tremco 440 tape, meeting requirements of AAMA 800-92 specification 804.3 and 807.3, or equivalent. The insulation layers (57) may be 2" SM insulation, such as Dow Corning brand Foamular 600 (60PSI) or equivalent or polyiso.

In a non-limiting embodiment, the panel of FIG. 3 *b*) may comprise a covering material (58) which may be a ⅛" A1 sheet or equivalent, insulation layers (57) which may be may be 2" SM insulation, such as Dow Corning brand Foamular 600 (60PSI) or equivalent or polyiso, butyl tape (56) may be Tremco 440 tape, meeting requirements of AAMA 800-92 specification 804.3 and 807.3, or equivalent, to provide a water tight seal at temperatures between at least about −40 to 35° C., and frame (55), which may be an aluminum AISC structural shape C channel, with a size of about 2.00×1.39, a web thickness of about 0.321, a flange thickness of about 0.296", and may be painted or powder coated black after fabrication of the frame.

Figure 4:
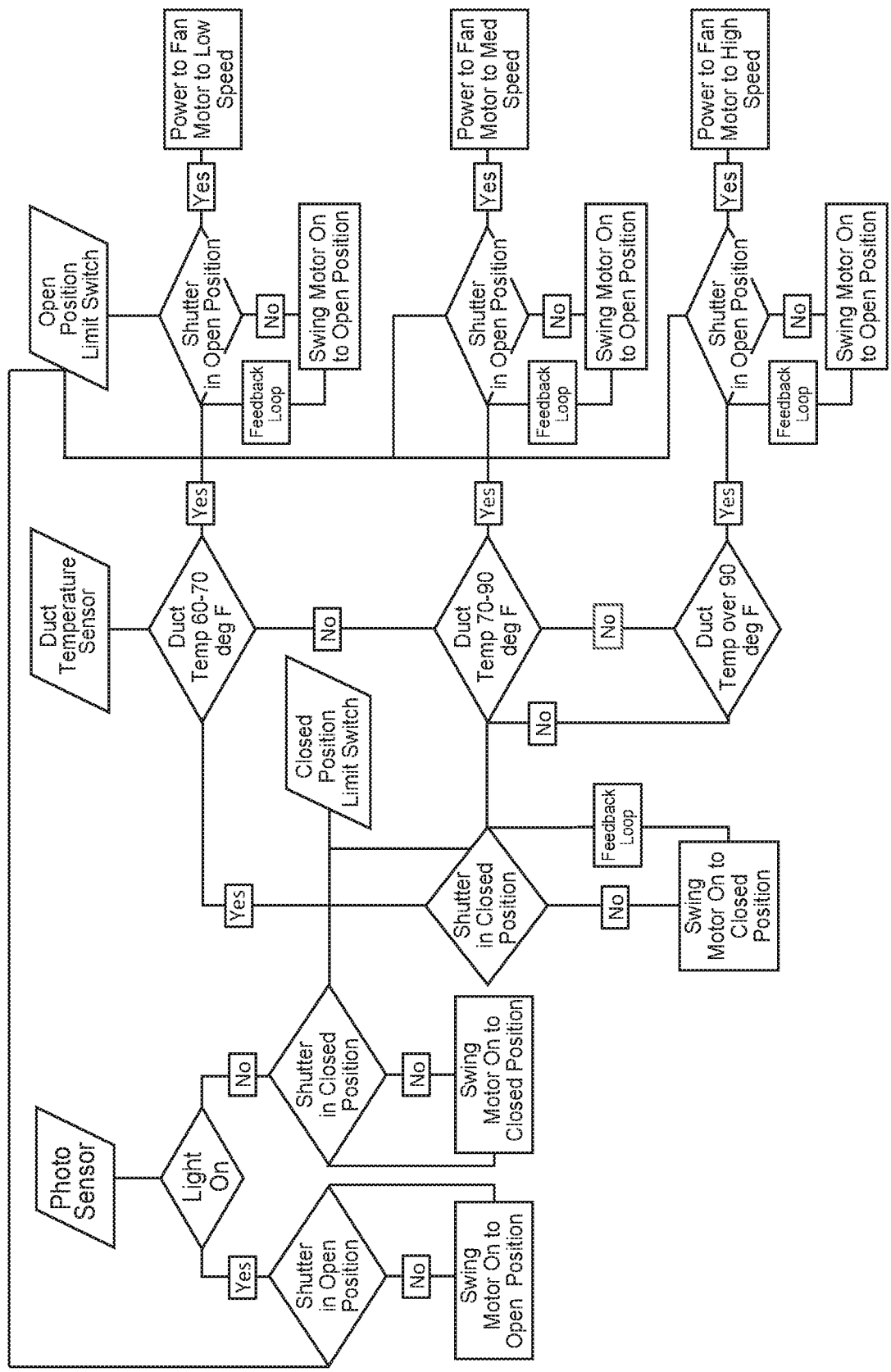
FIG. 4 shows a flow chart for an embodiment of a thermal insulating apparatus featuring an automated mechanism for operating the thermal insulating apparatus between open and closed positions, and automating operation of a heat circulation fan, based on temperature and light sensing.

FIG. 4 provides an example flow chart for an embodiment of a thermal insulating apparatus featuring an "auto mode" for operating a thermal insulating apparatus having both insulating and heat generating features between open and closed positions (via, for example, a swing motor), and for operation and control of a heat circulation fan, based on temperature and light sensing and user input. Control inputs may include, as shown, an open/close limit switch, a duct temperature sensor, a photo/light sensor, and a mode switch to switch between auto and manual modes.

Figure 5:
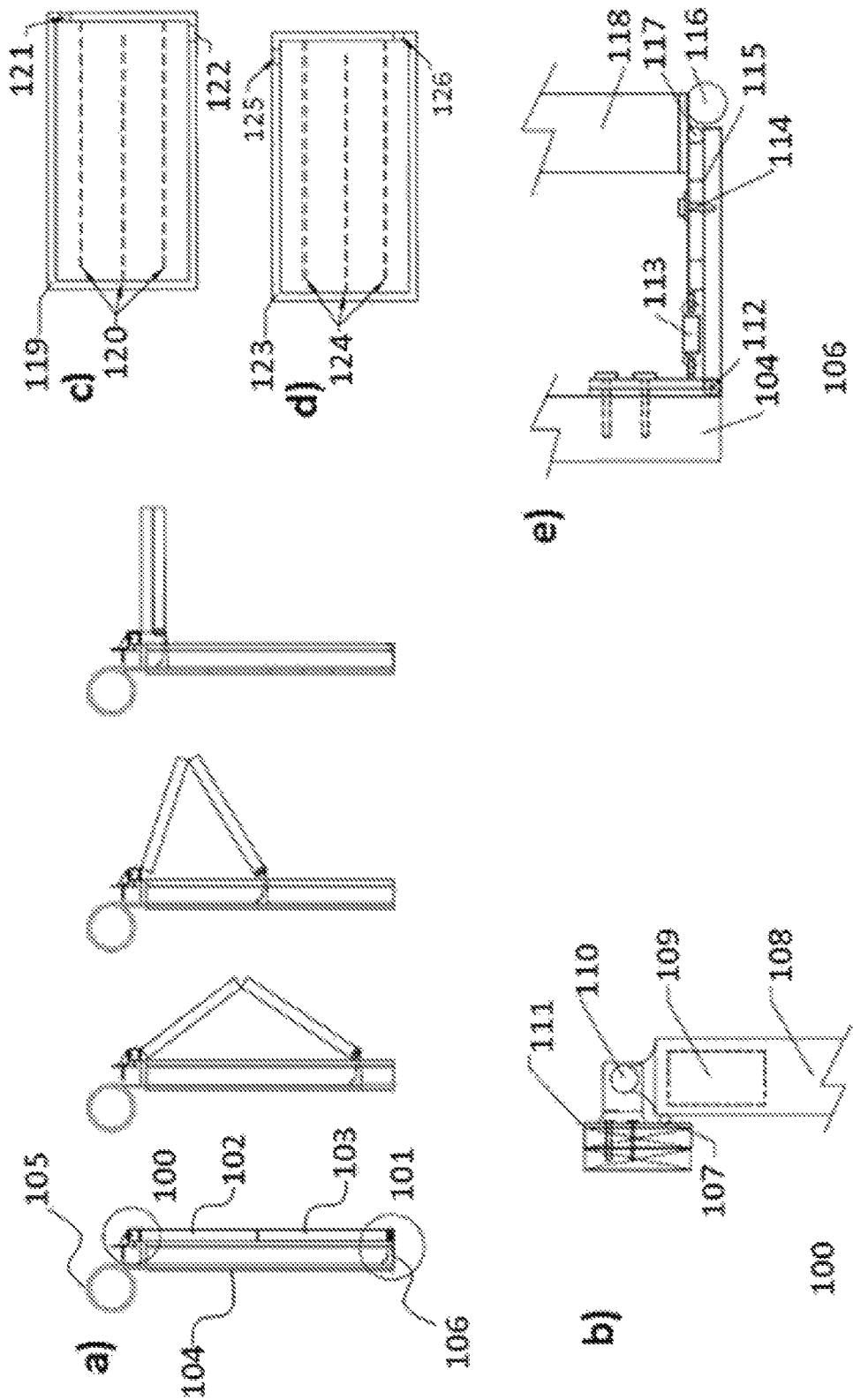
FIG. 5 shows an embodiment of a thermal insulating apparatus having insulation and heat generation features, installed at an overhead door exterior wall opening (such as a garage door). In a), the thermal insulating apparatus is operable between an open position (right frame) and a closed position (left frame) and uses the opening/closing mechanism of the overhead door to operate between open and closed positions. b) shows an expanded view of the upper pivot section of the thermal insulating apparatus embodiment in a). c) shows an upper panel side cross-section of the thermal insulating apparatus embodiment of a), and d) shows a lower panel side cross-section of the thermal insulating apparatus of a). e) shows an expanded view of the lower lift bar section of the thermal insulating apparatus of a)

FIG. 5 shows an embodiment of a thermal insulating apparatus having insulation and heat generation features, installed at an overhead door exterior wall opening (such as a garage door). In a), the thermal insulating apparatus is operable between a closed position (left frame, in which the wall opening is insulated and heat in being generated from sunlight) and an open position (right frame, in which the wall opening is accessible for entry/exit), and uses the opening/closed mechanism (105) of the overhead door (104) to operate between open and closed positions. The illustrated thermal insulating apparatus comprises an upper panel (102), a lower panel (103), an upper pivot section (100), and a lower lift bar section (101). In the closed position, the thermal insulating apparatus has the solar thermal collecting sections of panels (102) and (103) exposed to sunlight and generating heat, while also insulating the overhead door. In the open position, the upper and lower panels are folded together, allowing access to and from the garage. FIG. 5 *b*) shows an expanded view of the upper pivot section (100) of the thermal insulating apparatus embodiment in a), illustrating a lag-bolt attached bracket (111), optionally a T6 aluminum bracket, which may optionally be painted or powder coated, joined to the door frame, hinge pin (110), a seal (107) (such as, for example, a polypropylene seal) between the garage door frame or perimeter surface and the upper panel (108), and a warm air outlet duct (109) for connection to ductwork while the thermal insulating apparatus is in the closed position. The ductwork, or the thermal insulating apparatus itself, may comprise a circulation fan, such as a circulation fan having about 900 CFM or more, for circulating heated air. Alternatively, a fluid may be used for heat exchange, and a pump may be used instead of a fan. FIG. 5 *c*) shows an upper panel section of the thermal insulating apparatus embodiment of FIG. 5 *a*), and FIG. 5 *d*) shows a lower panel section of the thermal insulating apparatus of FIG. 5 *a*). The upper panel section comprises a warm air outlet (121) which may be connectable to ductwork while the thermal insulating apparatus is in the closed position, a frame (119), supports (120) for bracing and/or directing the path of heat exchange air or fluid through the panel, and cold air inlet (122), which may be connected to the warm air outlet (125) of the lower panel shown in FIG. 5 *d*) while in the closed position. The lower panel, similarly, comprises a frame (123), supports (124) for bracing and/or directing the path of heat exchange air or fluid through the panel, cold air inlet (126), and warm air outlet (125). FIG. 5 *e*) shows an expanded view of the lower lift bar section (101) of the thermal insulating apparatus of FIG. 5 *a*). Lower lift bar section (101) comprises a lower hinge point (112) attached to garage door (104), a linear spring (113), a slip bolt with tension resistance (114), a slip joint (115), a seal (116) such as a polypropylene seal, and a hinge point (117) joined to lower panel (118) of the thermal insulating apparatus. These elements are configured on or integrated with lower lift bar (106), which couples the garage door to the thermal insulating apparatus such that lifting the garage door also lifts the thermal insulating apparatus. The person of skill in the art having regard to this disclosure will recognize that several options and variations are available for coupling the garage door to the thermal insulating apparatus in such a manner. By way of example, additional secondary cables may be included for achieving lift.

Figure 6:
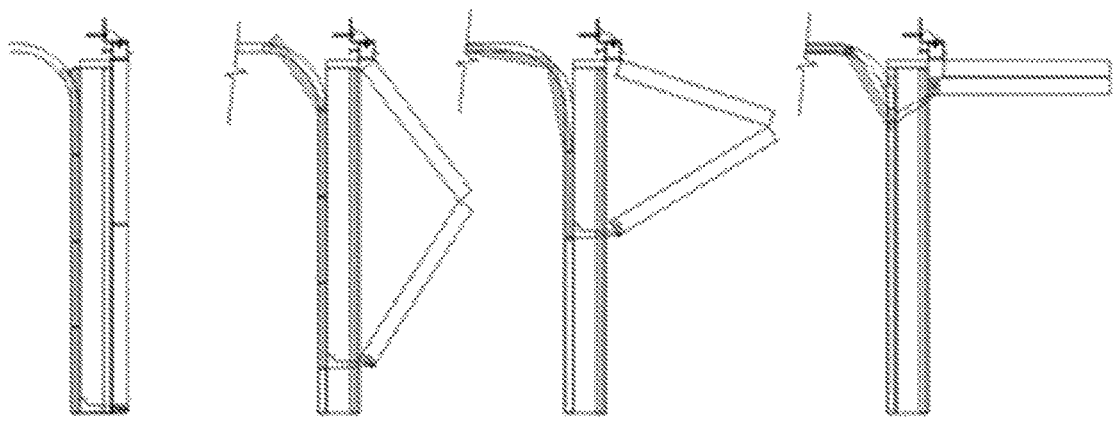
FIG. 6 shows embodiments of a thermal insulating apparatus having insulating features, installed at a panel-type overhead door in a), and installed at a roll-up type overhead door in b)
Figure 6:
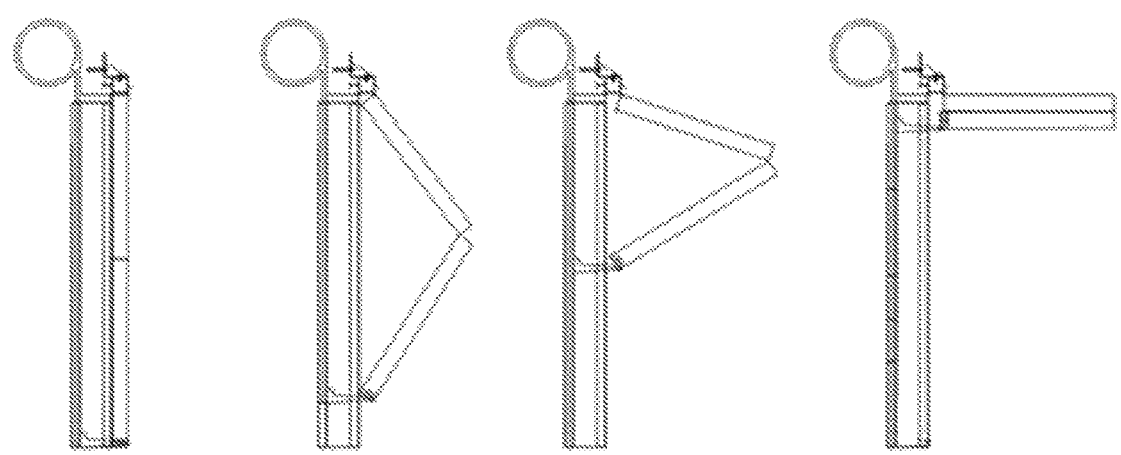

FIG. 6 shows embodiments of a thermal insulating apparatus having insulation features, installed at a panel-type overhead door (see FIG. 6 *a*)), and installed at a roll-up type overhead door (see FIG. 6 *b*)). In these examples, opening of the garage door also results in opening of the thermal insulating apparatus, as the two are coupled together by a lower lift bar (106). The left frames of FIGS. 6 *a*) and *b*) show the thermal insulating apparatus in a closed position, insulating the wall opening. The right frames of FIGS. 6 *a*) and *b*) show the thermal insulating apparatus in an open position, allowing entry/exit from the garage door. The rightmost frame of FIG. 6 *b*) shows an overlay of the thermal insulating apparatus in an open position (shown at the top of the door opening) and in a closed or starting position as per the leftmost frame of FIG. 6 *b*).

Figure 7:
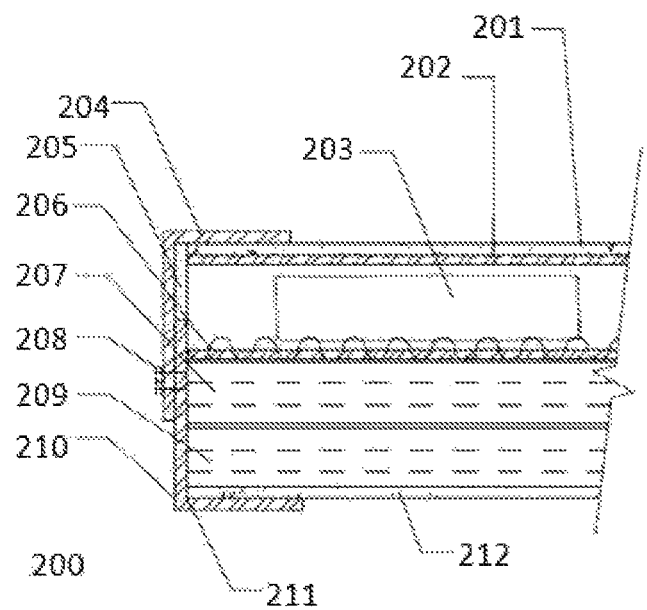
FIG. 7 shows a cross-sectional view of further embodiments of a thermal insulating apparatus panel. The panel in a) comprises solar thermal collector portion(s)/layer(s) on one side, and insulating portion(s)/layer(s) on the other side, and thus has both insulating and heat generating features. The panel in b) comprises insulating layer(s), thus having insulating features.
Figure 7:
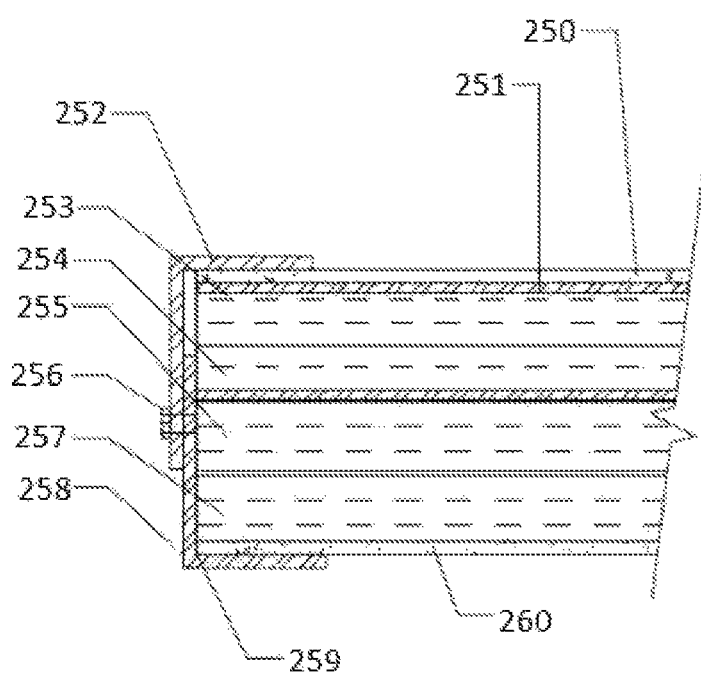

FIG. 7 shows a cross-sectional views of embodiments of thermal insulating apparatus panels. The panel (200) in a) comprises outer glazing (201), lateral bracing (202) in the form of a C-channel, a hollow channel or space (203) which is part of the solar collector portion, an outer frame (204) and an inner frame (210) joined through bolt (208), butyl tape (205), a metal corrugated collector (206) portion of the solar thermal collector, insulation layers (207) and (209) which, in this non-limiting example, each comprise 1" SM insulation having R6.5, and an inner backing (212). The outer glazing (201), solar thermal collector, and insulating layers (207)

and (209) are held together and sealed by butyl tape (205) and the outer and inner frames (204) and (210) in this embodiment. In this embodiment metallic surfaces in contact with other components are coated with an optional 2 part (low conductivity) epoxy (211), such as, for example, Masterbond™ product EP-42HT-2LTE. The outer or front glazing and/or the inner backing may, in some examples, be polycarbonate sheets (such as, for example, IAW ANSI Z97.1 specified as Makrolon SL or equivalent having a nominal thickness of about 3/16"). The solar collector may, in some examples, comprise a corrugated aluminum sheet, or equivalent, having a nominal thickness of about 0.019" and optionally painted black on one or both sides. A wire mesh having a similar heat transfer area may be substituted or used in addition. The inner and outer frames may, in some examples, be AISC structural shape C-channel, standard aluminum, and may be painted or powder coated black. The lateral bracing may, in some examples, be AISC structural shape C-channel standard aluminum, and may be painted or powder coated black. The panel of a) is able to provide both insulation and heat generation.

The panel in FIG. 7 b) comprises outer skin (250), lateral bracing (251) in the form of a C-channel, outer frame (252) joined to inner frame (258) by bolt(s) (256), four insulation layers (253), (254), (255), and (257), and inner backing (260). In this embodiment metallic surfaces in contact with other components are coated with an optional 2 part (low conductivity) epoxy (259), such as, for example, Masterbond™ product EP-42HT-2LTE. In the illustrated example, insulation layer (253) is ½" SM insulation having R3.25, and insulation layers (254), (255), and (257) are each 1" SM insulation having R6.5. The person of skill in the art will recognize that many other configurations and modifications may be possible. In the illustrated non-limiting example, the outer skin is a ⅛" aluminum sheet, the inner and outer frames may, in some examples, be AISC structural shape C-channel, standard aluminum, and may be painted or powder coated black. Butyl tape, such as Tremco 440 tape, may be used to provide a water tight seal over wide temperature range suitable for the operating environment. The lateral bracing may, in some examples, be AISC structural shape C-channel standard aluminum, and may be painted or powder coated black. The panel of b) is able to provide thermal insulation.

Figure 8:
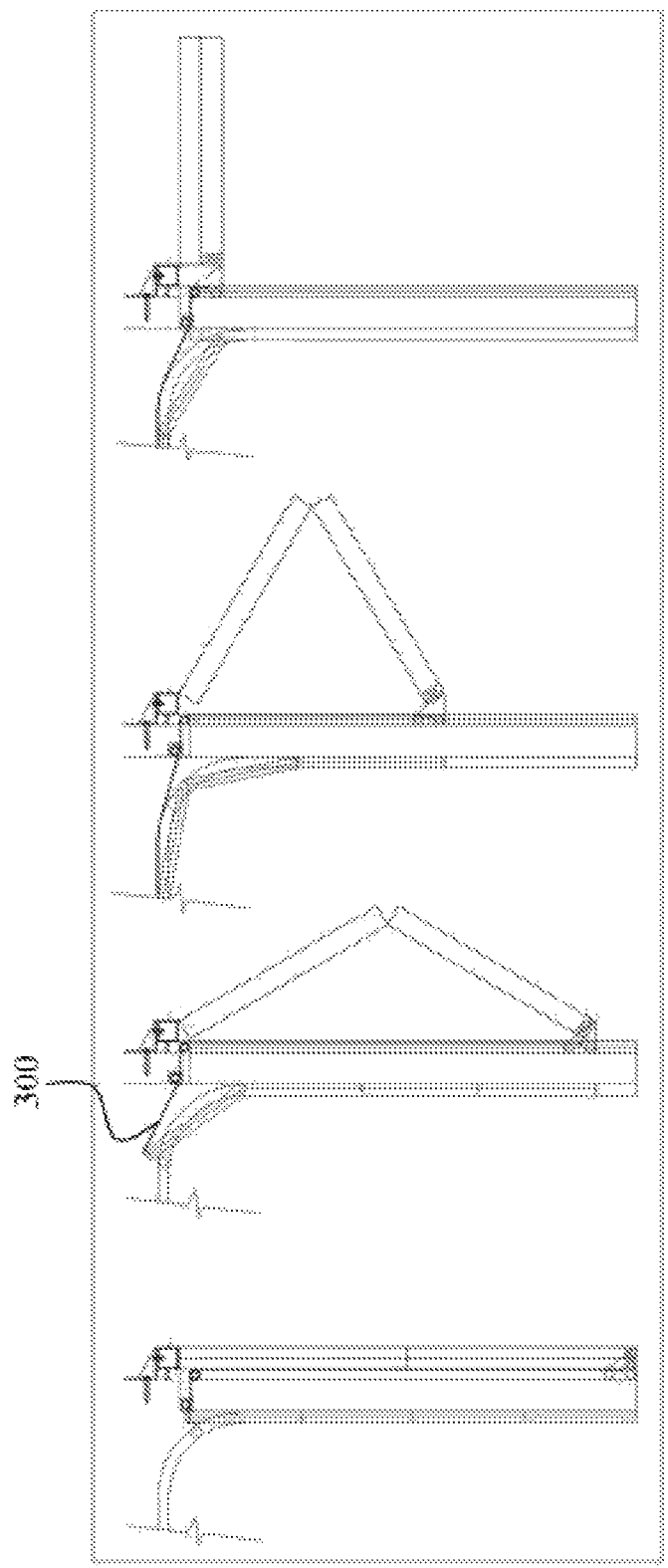
FIG. 8 shows an embodiment of a thermal insulating apparatus having insulating features, installed at a panel-type overhead door, where coupling and lift of the thermal insulating apparatus is achieved through a cable lift-type mechanism.

FIG. 8 shows another embodiment of a thermal insulating apparatus having insulating features, installed at a panel-type overhead door, which is similar to embodiments depicted in FIG. 6. In the embodiment illustrated in FIG. 8, however, coupling and lift of the thermal insulating apparatus is achieved through a cable lift-type mechanism, which involves one or more cables (300) as shown.

It will be recognized that embodiments of thermal insulation panels provided herein may comprise one or more seals for providing a substantially sealed interface between the thermal insulating apparatus and the frame or other surface surrounding the perimeter of a wall opening such as a window or door, thus preventing heat loss or heat transfer in or out, and improving wall opening seals while the thermal insulation panel is in a closed position. When installed on a garage door, for example, a thermal insulating apparatus as described herein may include, in an embodiment, sealing elements about the periphery of the apparatus for sealing against the frame of the garage door, reducing or preventing air flow between the interior of the building and the outside.

It will be understood that thermal insulating apparatus as provided herein may be suitable for retrofitting to existing windows, doors, or other wall openings which are already installed on a home or other structure, or to existing windows, doors, or other wall openings prior to installation on a home or other structure. It will also be understood that in other embodiments, thermal insulating apparatus as provided herein may be integrated with new windows and/or doors so as to provide a combined unit, such as a pre-fabricated unit, for installation on a home or other structure. For example, a garage door or window may comprise a thermal insulating apparatus as described herein integrated on its exterior-facing portion or side.

It will further be understood that, in certain embodiments, thermal insulating apparatus comprising at least one solar thermal energy collector unit for collecting heat from solar thermal energy from sunlight as described herein may be used to insulate and/or generate heat at a wall section of a building envelope. By way of example, FIG. 1 depicts an embodiment wherein a wall section of a building envelope which is adjacent a window is insulated and provides a site of heat generation from solar energy while the thermal insulating apparatus is in an open position.

It will be understood that, in certain embodiments, the thermal insulating apparatus need not be positioned near a wall opening, and may instead be positioned at a wall section of a building envelope. In such embodiments, the thermal insulating apparatus may be installed such that the solar thermal energy collector unit is exposed to sunlight during the day, and the opposing one or more layers of insulating material provide enhanced insulation to the wall section. In certain embodiments, such thermal insulating apparatus may, optionally, be operable between two orientations, one in which the solar thermal energy collector unit is exposed to sunlight when heat generation is desired, and one in which the solar thermal energy collector unit faces the wall section and is not exposed to sunlight when heat generation is not desired. It will additionally be understood that, in certain embodiments, such thermal insulating apparatus may function in a curtain wall-type manner in which the thermal insulating apparatus may be installed over an existing wall section, or may be provided as a post-integrated wall component which may be directly integrated into a building envelope as a modular or pre-fabricated component during building construction. By way of example, such post-integrated wall components may include posts or framing about the thermal insulating apparatus periphery, which may be sized to allow for simple integration into a building project at the framing stage.

It will further be understood that, in certain embodiments, thermal insulating apparatus including a solar thermal energy collection unit as described herein may be used to provide heat to other elements in need of heating, so as to provide energy savings. For example, heat from a thermal insulating apparatus may be used to heat domestic hot water in certain embodiments.

All references referred to herein are hereby incorporated by reference in their entirety.

One or more illustrative embodiments or examples have been described by way of non-limiting example. All embodiments and examples provided herein should be viewed as non-limiting. It will be understood to persons skilled in the art that a number of variations and modifications can be made without departing from the scope of the invention as defined in the claims.

What is claimed is:

1. A thermal insulating apparatus for insulating a wall opening having an overhead door, said thermal insulating apparatus comprising:

two or more panels, each comprising one or more layers of insulating material, and the two or more panels further comprising at least one solar thermal energy collector unit for collecting heat from solar thermal energy from sunlight, wherein the solar thermal energy collector unit is connectable to ductwork for distributing collected heat to an interior space of a structure comprising the wall opening;

at least one attachment site for joining the thermal insulating apparatus to at least one position at said wall opening;

wherein the thermal insulating apparatus is for installation exterior to the overhead door with the thermal insulating apparatus being operable between an open position in which the panels fold together when the overhead door is opened allowing access to said wall opening, and a closed position in which at least one panel of the thermal insulating apparatus substantially covers and thermally insulates said wall opening when the overhead door is closed;

wherein the thermal insulating apparatus further comprises a lower lift bar section for coupling the thermal insulating apparatus to the overhead door such that lifting the overhead door places the thermal insulating apparatus in the open position; and wherein the lower lift bar section comprises a lower lift bar comprising a lower hinge point for attachment to the overhead door, and a hinge point for joining to the thermal insulating apparatus.

2. The thermal insulating apparatus of claim 1, wherein the solar thermal energy collector unit is integrated in the panel opposite the one or more layers of insulating material.

3. The thermal insulating apparatus of claim 1, wherein collected heat is distributed to the interior space by circulation of air or fluid heated by the solar thermal energy collector unit so as to allow heat exchange between the heated air or fluid and the interior space.

4. The thermal insulating apparatus of claim 1, wherein the solar thermal energy collector unit collects heat from solar thermal energy while in the closed position.

5. The thermal insulating apparatus of claim 1, wherein the lower lift bar section further comprises a linear spring, a slip bolt with tension resistance, and a slip joint installed between the lower hinge point for attachment to the overhead door and the hinge point for joining to the thermal insulating apparatus.

6. The thermal insulating apparatus of claim 1, wherein the overhead door comprises a garage door.

7. The thermal insulating apparatus of claim 1, wherein the thermal insulating apparatus is configured for retrofitting to an existing overhead door.

* * * * *